United States Patent
Bryant et al.

(10) Patent No.: US 8,542,714 B2
(45) Date of Patent: Sep. 24, 2013

(54) METHOD AND SYSTEM FOR RECONSTRUCTING TIME OF TRANSMIT FROM ASSISTED OR WEAK SIGNAL GPS OBSERVATIONS

(75) Inventors: Roderick Bryant, Conder (AU); Eamonn P. Glennon, Torrens (AU); Ian Anthony Sainsbery, Narrabundah (AU); John Kenmure Gordon, Hawker (AU)

(73) Assignee: u-blox AG, Thalwil (CH)

( * ) Notice: Subject to any disclaimer, the term of this patent is extended or adjusted under 35 U.S.C. 154(b) by 1107 days.

(21) Appl. No.: 11/935,152

(22) Filed: Nov. 5, 2007

(65) Prior Publication Data

US 2008/0088505 A1 Apr. 17, 2008

Related U.S. Application Data

(63) Continuation-in-part of application No. 11/460,784, filed on Jul. 28, 2006, now abandoned, and a continuation-in-part of application No. 11/769,259, filed on Jun. 27, 2007.

(60) Provisional application No. 60/703,637, filed on Jul. 29, 2005.

(51) Int. Cl.
  *H04B 1/00* (2006.01)
(52) U.S. Cl.
  USPC ............ 375/140; 375/355; 375/343; 375/325
(58) Field of Classification Search
  USPC ....................................................... 375/140
  See application file for complete search history.

(56) References Cited

U.S. PATENT DOCUMENTS

| | | | | |
|---|---|---|---|---|
| 5,075,693 A | * | 12/1991 | McMillan et al. | 342/457 |
| 5,654,991 A | * | 8/1997 | Andren et al. | 375/355 |
| 5,999,561 A | * | 12/1999 | Naden et al. | 375/142 |
| 6,346,911 B1 | | 2/2002 | King | |
| 6,473,694 B1 | | 10/2002 | Akopian et al. | |
| 6,532,251 B1 | * | 3/2003 | King et al. | 375/142 |
| 6,560,294 B1 | * | 5/2003 | Gatherer | 375/261 |
| 6,633,621 B1 | | 10/2003 | Bishop et al. | |
| 6,771,215 B2 | | 8/2004 | Akopian et al. | |
| 6,931,055 B1 | * | 8/2005 | Underbrink et al. | 375/150 |
| 2001/0018663 A1 | | 8/2001 | Dussell et al. | |
| 2003/0090413 A1 | | 5/2003 | Syrjarinne et al. | |
| 2003/0103476 A1 | * | 6/2003 | Choi et al. | 370/329 |
| 2004/0057505 A1 | | 3/2004 | Valio | |
| 2007/0139263 A1 | * | 6/2007 | Xie et al. | 342/357.02 |

OTHER PUBLICATIONS

Akopian et al. "A Network Aided Inerated LS Method for GPS Positioning and Time Recovery Without Network Messaging Decoding" IEEE 2002, p. 77-84.

* cited by examiner

*Primary Examiner* — Lihong Yu (57) ABSTRACT

This invention provides methods for a GPS device to resolve timing errors as applicable to a AGPS navigation solution, and, in particular, to solutions involving GNSS positioning and timing with limited assistance such as indoors or in a heavily obscured location, where the time of transmit of satellite signals is not directly extractable from the navigation message data. In particular the invention concerns the reconstruction of time-of-transmit from the course acquisition code of weak signals or where assisted-GNSS are employed.

11 Claims, 6 Drawing Sheets

PERFORMING COHERENT SUM CALCULATIONS

FIG. 5

DETERMINE BIT ALIGNMENT AND ITS RELIABILITY

FIG. 6

METHOD AND SYSTEM FOR RECONSTRUCTING TIME OF TRANSMIT FROM ASSISTED OR WEAK SIGNAL GPS OBSERVATIONS

This application is a continuation-in-part of United States non-provisional applications Ser. No. 11/460,784, filed Jul. 28, 2006 now abandoned, and Ser. No. 11/769,259, filed Jun. 27, 2007, and U.S. provisional application 60/703,637, filed Jul. 29, 2005.

FIELD OF THE INVENTION

This invention relates to Global Navigation Satellite Systems (GNSS), including pseudolite systems, GNSS positioning and timing with limited assistance such as indoors or in a heavily obscured location, where the time of transmit (TOT) of satellite signals is not directly extractable from the navigation message data. In particular the invention concerns the reconstruction of time-of-transmit from the course acquisition (CIA) code of weak signals or where assisted-GNSS are employed. The invention relates to all forms of GNSS including GPS, Glonass, and Galileo systems and others, as well as augmentation systems such as WAAS, LAAS, EGNOS, MSAS and others.

BACKGROUND OF THE INVENTION

This invention relates to a class of GNSS applications such as, but not limited to, the following:
1. Syntonization (i.e., locking to a precise frequency reference) and synchronization (i.e., locking to a precise timing reference) of short range wireless communication access points or base stations (such as wireless communications picocells and femtocells),
2. Location of shipping containers,
3. Location of cryogenic transport containers, and
4. Location, syntonization, and synchronization of seismic sensors used in arrays for geological surveying.

Such applications are characterized as follows:
1. The GNSS receiver is embedded in a piece of portable or transportable equipment which may not be moving or moving slowly when in use;
2. The GNSS antenna is co-located with or nearby the receiver equipment;
3. The sky is generally at least partly obscured at the GNSS antenna;
4. The GNSS receiver has access to the internet or to a Wireless LAN, from which it can receive assistance;
5. The GNSS receiver provides syntonization, synchronization, location, or a combination to the host equipment.

These characteristics differ from those of other Assisted GPS (AGPS) applications in a number of respects. Most AGPS applications relate to the location of mobile equipment and, especially, to the location of cellular handsets. Such devices are often in motion when in use. Because the receivers communicate with a base station, their approximate location can be determined by the location of the base station, whereas in the class of application addressed by the present invention, there often is no such source of location assistance. Also, the present invention is capable of providing precise synchronization and syntonization whereas most AGPS applications only provide location.

This class of applications will be referred to from here on as the "Target Applications."

GPS signals incorporate a spreading code that is multiplied into the signal and repeated every millisecond. All GPS and AGPS receivers operate by generating a local replica of the spreading code for each satellite signal to be tracked and they align the local replica code with the incoming spreading code via a correlation technique. Once aligned, the spreading code is removed from the incoming signal by simply multiplying the signal by the replica code. In a conventional GPS receiver, the phases of the replica codes (which are the same as those of the incoming signals) are all latched at each measurement instant along with the Time Of Receipt (TOR) given by the receiver's clock.

In a conventional receiver the code epochs in each data bit are counted, the bits are counted in the words, and the words are counted in the subframes. Hence it is possible to determine exactly how many code epochs have elapsed since the last subframe boundary. The elapsed number of code epochs can be combined with the codephase at the measurement instant to determine the exact elapsed time (in satellite time) between the last subframe boundary and the measurement instant. This term is added to the time tag of the subframe boundary to give the exact TOT corresponding to the measurement instant. This term is subtracted from the latched TOR, with the result multiplied by the speed of light to yield the pseudorange.

The pseudoranges from multiple satellites are used along with the satellite locations at the corresponding TOTs to estimate the location of the receiver and the error in the TOR. This determination allows the receiver clock to be very precisely calibrated so that it can be used for both synchronization and syntonization.

AGPS location solutions differ from traditional GPS location solutions due to the use of ambiguous codephases instead of full TOTs for each GPS satellite observation. Because the signals are often too weak to allow the data to be adequately or completely extracted, it is not possible to accurately count the code epochs from the bit boundaries, to count the bits, or to count the words from the subframe boundaries. Therefore it is necessary to reconstruct the full TOT using some other means.

In the prior art, the full TOT is reconstructed using apriori knowledge, such as a position estimate within 75 km of the true position and an estimate of TOR. Errors arise if the initial TOR used to construct the TOT observations are in error. Gross errors can also result from incorrect codephase ambiguity resolution if the initial position error is larger than 75 km. The present invention resolves both of these difficulties.

AGPS is able to perform a navigation solution through the use of prior information, including a rough estimate of the position of the receiver and a time tag for the TOR. When the receiver is in communication with a base station, the rough estimate of position of the receiver is generally based on the location of the cell site. These parameters can then be used to estimate ranges to each satellite which together with the initial TOR estimate can be used to estimate a full TOT for each satellite. However, since the initial TOR typically contains errors, the reconstructed TOTs will all be subject to a common timing error thereby resulting in navigation position errors in the solution process.

The problem of time-recovery for AGPS is discussed in J. Syrjarinne, "Possibilities for GPS Time Recovery with GSM Network Assistance," presented at ION GPS 2000, Salt-Lake City, Utah, 2000, and M. M. Chanarkar, "Resolving time ambiguity in GPS using over-determined navigation solution." United States of America: Sirf Technology, Inc, 2003. This reference outlines general algorithms for solution of the timing error through addition of an additional variable and its solution using least squares techniques.

Approaches, such as by Surjarinne, are adequate to reduce the common timing error to the point that the corresponding position error is small. The latter results from the satellite positions being incorrectly calculated because of the common timing error. If the common timing error is only a few milliseconds, then the resulting receiver location will only be incorrect by a few meters. However, if the receiver is to be used for synchronization, timing errors of a few milliseconds are unacceptable. The millisecond ambiguity must be completely and reliably resolved. The present invention provides this level of reliability in the ambiguity resolution.

Another approach is disclosed in U.S. Pat. No. 6,459,407. However, in that scheme, as in much of the prior art, an approximate location accurate enough to assist in resolving the codephase ambiguity is supplied from a cellular base station which is not the case in many of the target application of the present invention. In contrast to U.S. Pat. No. 6,459,407, the present invention does not presume the availability of a GPS-enabled base station used for determining the location of a cellular terminal, having access to location assistance that is accurate enough to assist in resolving the codephase ambiguity.

An approach to the complete resolution of the codephase ambiguity within the prior art relies on at least one satellite signal being strong enough to permit full resolution of the TOT in the conventional way. If the position is also known to within 75 km then the TOT differences between any two satellite signals at the measurement instant cannot be more than 150 km divided by the speed of light or 0.5 milliseconds. Thus it is relatively easy to establish the TOT of all other satellite signals based on that of the first one and the codephases of the other signals at the measurement instant.

That approach, however, suffers from serious drawbacks for use in the applications for which the present invention is intended. First, the GPS receiver antenna may often be located where it is not possible to receive one signal strong enough to permit data extraction and resolution of the TOT in the conventional way. Second, the position of the receiver antenna may not be known to an accuracy of 75 km. Indeed, it may not be known to better than a few thousand km.

BRIEF DESCRIPTION OF THE INVENTION

Figure 3:
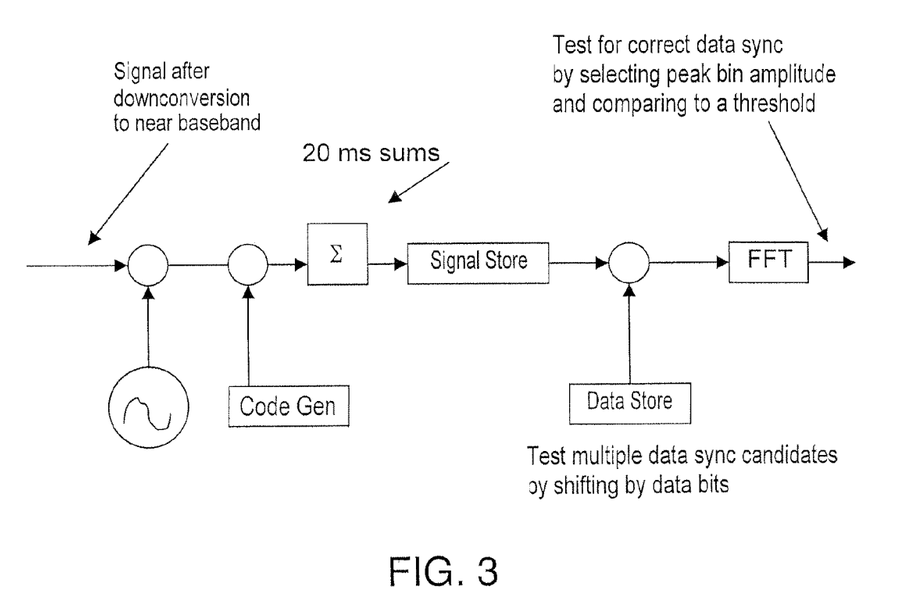
FIG. 3 depicts apparatus for testing the validity of a candidate time resolution by long coherent correlation across many bit periods or for resolving the time via a Maximum Likelihood Estimation (MLE) technique.

The data in the data store of FIG. 3 can be determined from the assistance supplied to the receiver. The ephemeris data occurs in certain subframes of the navigation message modulated in Binary Phase Shift Key (BPSK) onto the signal received from the carrier. The invention extracts this ephemeris data and, using mathematical techniques, recreates the exact bit sequence in the navigation message. The approximate alignment of this data sequence in time is also determined based upon the approximate time supplied and the time alignment of the subframes. Candidate data alignments are tested over a range equal to the uncertainty in the time assistance and the uncertainty in the time of flight from the satellites. The time of flight is estimated based on the calculated satellite position and the position assistance for the receiver.

Several possible scenarios exist in which all or part of the solution is applied, based on the uncertainty in the position assistance:.

1. If the required timing accuracy is x seconds then the receiver need not compute its own position provided the uncertainty in the position known apriori or provided via assistance is below cx meters where c is the speed of light in meters per second. For example, if 10 us accuracy is required then the position assistance uncertainty must be below approximately 1500 meters with some margin. This is because the greatest possible error in the assumed time of flight due to the position error of cx is equal to x. If the uncertainty is below cx by a suitable margin for other error sources then the receiver requires only a single satellite to achieve time synchronization. Once one signal has been acquired then, if it is too weak for data extraction, its codephase ambiguity can be resolved by the disclosed means and the time synchronization achieved.

2. If the uncertainty of the position known apriori or provided via assistance is below 75 km then the maximum error in the time of flight due to the position error is 0.25 milliseconds or a quarter of one code epoch. This means that once the codephase ambiguity has been resolved for one satellite signal it can also be resolved for any other satellite signals being tracked. In this case the disclosed ambiguity resolution algorithms need only be applied to a single satellite signal. Then unambiguous measurements can be determined for all other signals being tracked and the position can be estimated in the normal way. Once the position has been determined to the accuracy required as indicated in point 1 above then the time synchronization is achieved.

3. If the uncertainty of the position known apriori or provided via assistance is below 1500 km then the maximum error in the time of flight due to the position error is 5 ms or a quarter of one data bit period. A data bit period is the ambiguity remaining once bit synchronization has been achieved. Hence the ambiguity resolution algorithm disclosed need only be applied for a single weak signal. Bit synchronization is then required for each of the other weak signals being tracked and then the ambiguity can be resolved for all of the signals. Once that is done the position can be estimated in the usual way. Once the position has been determined to the accuracy required as indicated in point 1 above then the time synchronization is achieved.

4. If the uncertainty of the position known apriori or supplied via assistance is greater than 1500 km then there are two possible approaches to resolving the ambiguities as follows:

A Doppler-based position solution method can be used to reduce the position uncertainty to below 1500 km. Such methods rely on the relationship between the position of the receiver and the Doppler frequency shift due to the satellite motion. Using this relationship, the position can be estimated using the Doppler measurements alone. Although the resulting position errors can be quite large, they will typically be well below 1500 km. Since the Doppler measurements are unambiguous, they can be used to estimate position prior to the resolution of the codephase ambiguities. Then, if the uncertainty in that position is below 1500 km, the position and time can be determined as indicated in points 1 to 3 above.

The full ambiguity resolution scheme can be applied to all of the weak signals to be employed.

DETAILED DESCRIPTION OF PREFERRED EMBODIMENTS

GPS observations used in AGPS Mobile Station Assisted (MS-Assisted) or MS-Based navigation solutions generally consist of a set of C/A code phases measured at a given time-instant as well as Doppler frequency measurements. Because the C/A code has a repetition frequency of 1 kHz, the C/A code phases indicate the TOT modulo as 1 ms. For a navigation solution to be performed, it is necessary to reconstruct the full TOT for each satellite.

Figure 1:
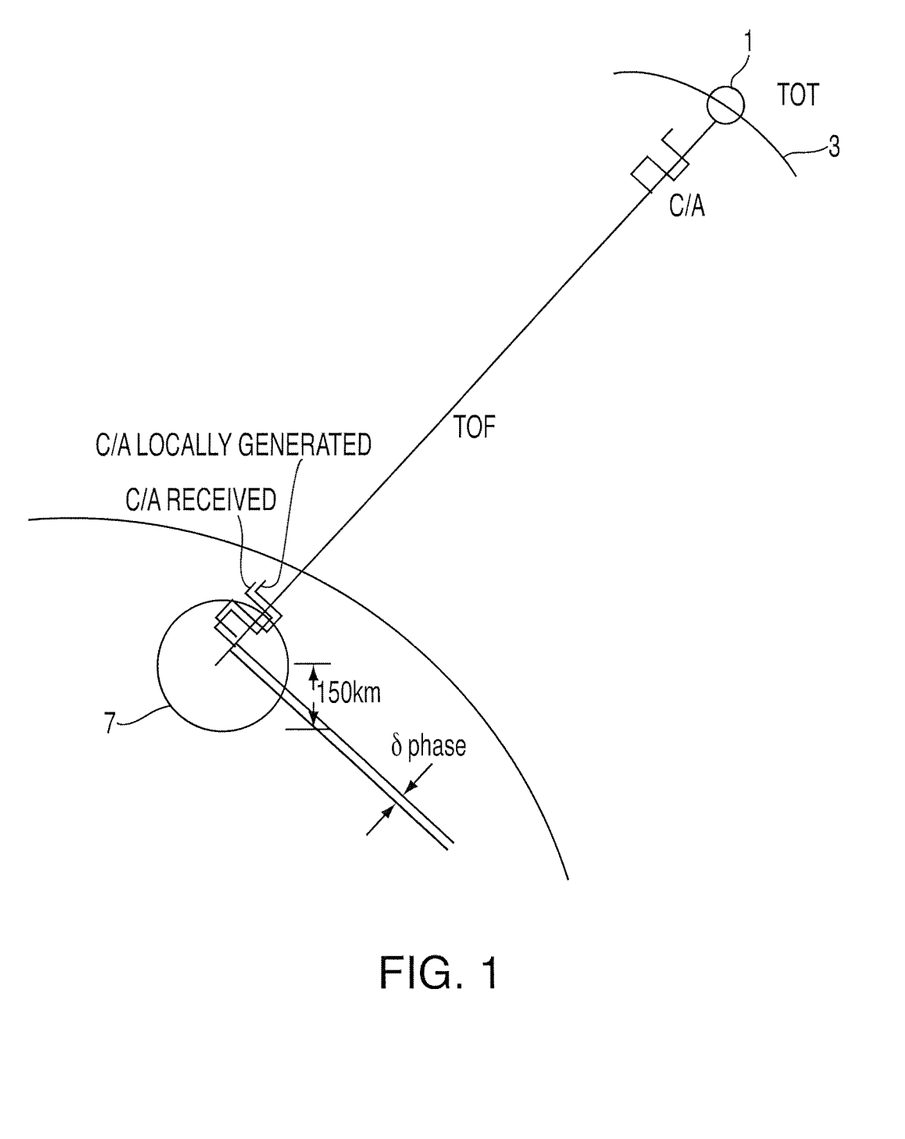
FIG. 1 depicts the timing for a satellite signal in the present invention.
Figure 4:
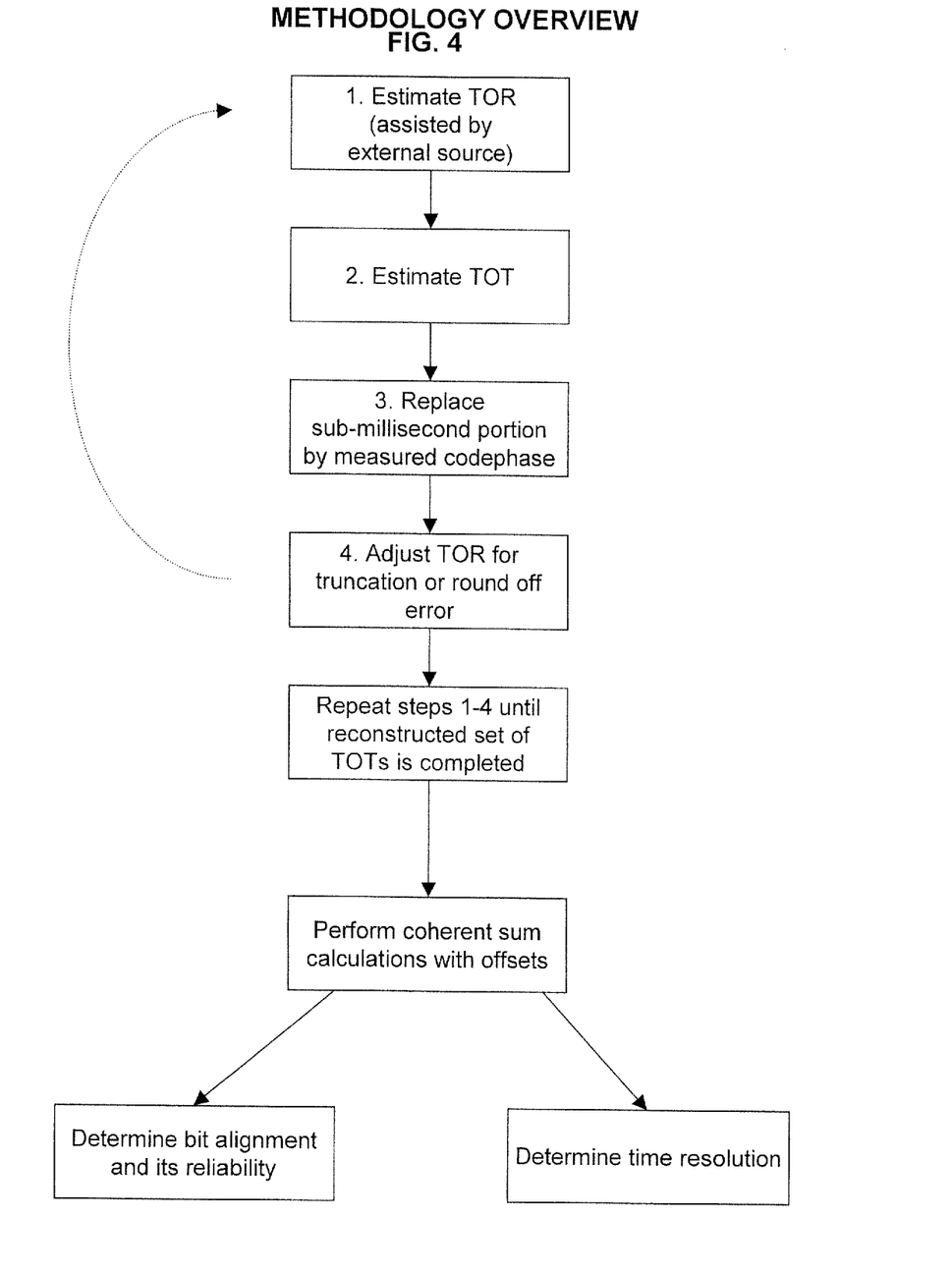
FIG. 4 presents a flow chart depicting an overview of the methodology of the present invention.

As shown in FIG. 1, a satellite 1 in an orbit 3 transmits a signal to a receiver 5 located on or near the surface of the earth. A portion of the signal, typically the start of an epoch, commences its transmission at a time TOT as measured by an accurate satellite clock, and commences its reception at a time TOR as measured by a less accurate receiver clock. A flow chart of the overall process is shown in FIG. 4. The process generally starts with an estimate of the TOR, at the time instant at which the observation was made, which is generally obtained using assistance from some external source. Subtracting an estimate for the satellite signal's time-of-flight (TOF) from the TOR then provides an estimate for each satellite TOT. The time of flight is essentially the phase shift in the C/A signal modulo the length of a C/A code epoch of 1 ms. Each TOT can then have its sub-millisecond portion replaced by the measured code phase and the resulting TOTs can then be corrected by an integer number of millisecond epochs such that the times are consistent with the specified coarse receiver location. Boundary truncation or round-off problems can be avoided by adjusting the initial TOR such that after application of the measured code phases, at least one satellite has a millisecond adjustment that is exactly zero. This procedure produces a set of reconstructed TOTs that is consistent with the true location at which the measurement was made and that can be then used to perform a navigation solution.

When the signal arrives at the receiver it is detected by its correlation with a locally generated C/A code. The phase difference between the locally generated code and the received code translates into a time difference modulo the length of a code epoch. The epoch difference is constrained by knowledge of the approximate location 7 of the receiver to an accuracy of about 75 km, since the speed of light is approximately 300 km/ms and the epoch length is 1 ms.

A problem with the above procedure is that any error in the initial TOR will result in biased TOTs. This is problematic in that each TOT is used to estimate the position of the corresponding satellite in its orbit 3 which means that if the TOT is incorrect then the satellite position will be incorrectly identified as well. Since each satellite range rate lies in the range of ±1000 m/s, a timing error in the TOT of as little as 0.01 seconds can result in pseudorange predictions that are in error by 10 m, while errors of 1 second can result in 1000 m pseudorange errors. These errors then result in biases in the calculated positions.

Even more importantly, in many of the applications for which the present invention is intended, the error in the resulting TOR can be many milliseconds. In many of these applications synchronization error may only be a few microseconds or even sub-microsecond.

Figure 5:
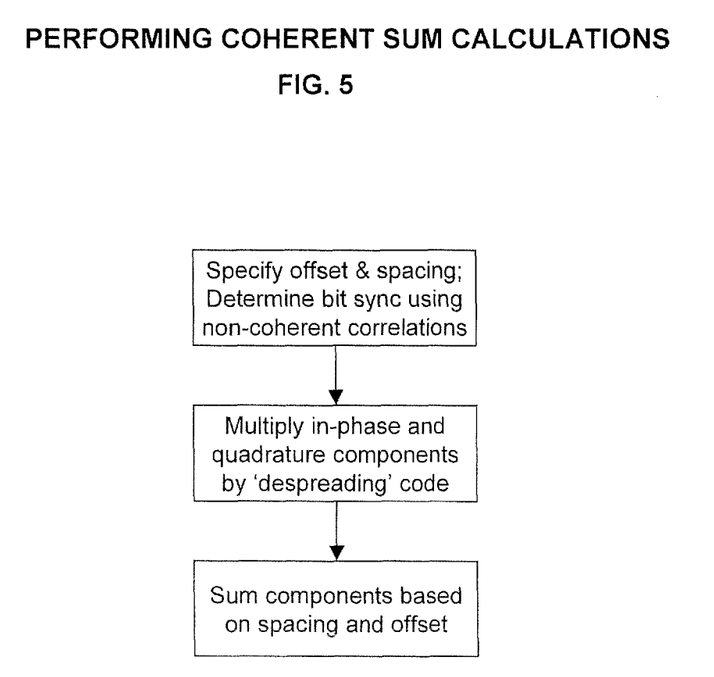
FIG. 5 presents a high-level flow chart of the steps for performing the coherent sums calculations of the present invention.

The steps of the coherent sums approach are shown in FIG. 5. In the preferred embodiment bit sync is obtained by performing non-coherent correlations over many rounds (typically 50 to several hundred) of 20 ms coherent correlations using 20 offsets at 1 ms spacing and choosing the alignment that yields the highest correlation. In that case, the 1 ms ambiguity of the codephase is replaced by a 20 ms ambiguity for the bits.

Figure 2:
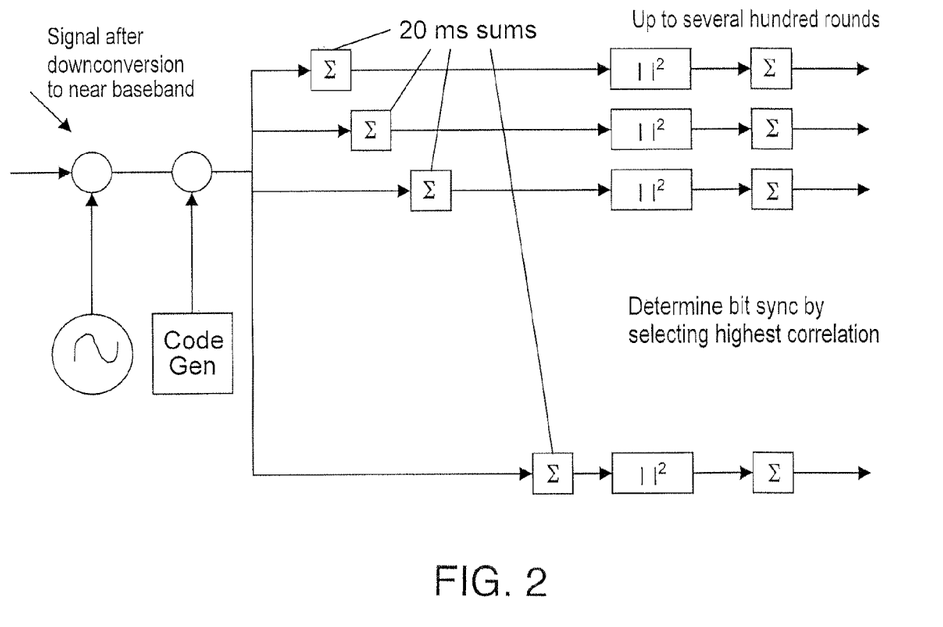
FIG. 2 depicts a weak signal bit synchronization scheme by performing non-coherent correlations over many rounds.

FIG. 2 depicts such a synchronization scheme. The complex signal from the GPS front-end is downconverted as closely as possible to DC. This needs to be sufficiently close such that the sample phase does not rotate appreciably during one 20 ms coherent integration period. The absolute phase of the signal can be arbitrary. Both the in-phase (I) and quadrature (Q) components of the complex signal samples are multiplied by the code to 'despread' the signal so that it occupies a narrow signal bandwidth (Note that FIG. 2 does not show the I and Q components separately.) Then the signal samples (both I and Q) are summed over 20 ms intervals in 20 summations spaced in time at 1 ms intervals. The alignment of these intervals to the bit intervals determines the magnitude of the signal components of the resulting sums with the one that is properly aligned, giving the largest result.

However, where the signal to noise ratio is very low, the noise component dominates in a single coherent integration period. For this reason, the squared magnitude of the complex coherent sums are further summed over many rounds of coherent summation resulting in non-coherent sums for which the signal component dominates over the noise component. The magnitudes of the sums can then be used to determine which coherent interval is aligned with the bit intervals in the incoming signal.

Figure 6:
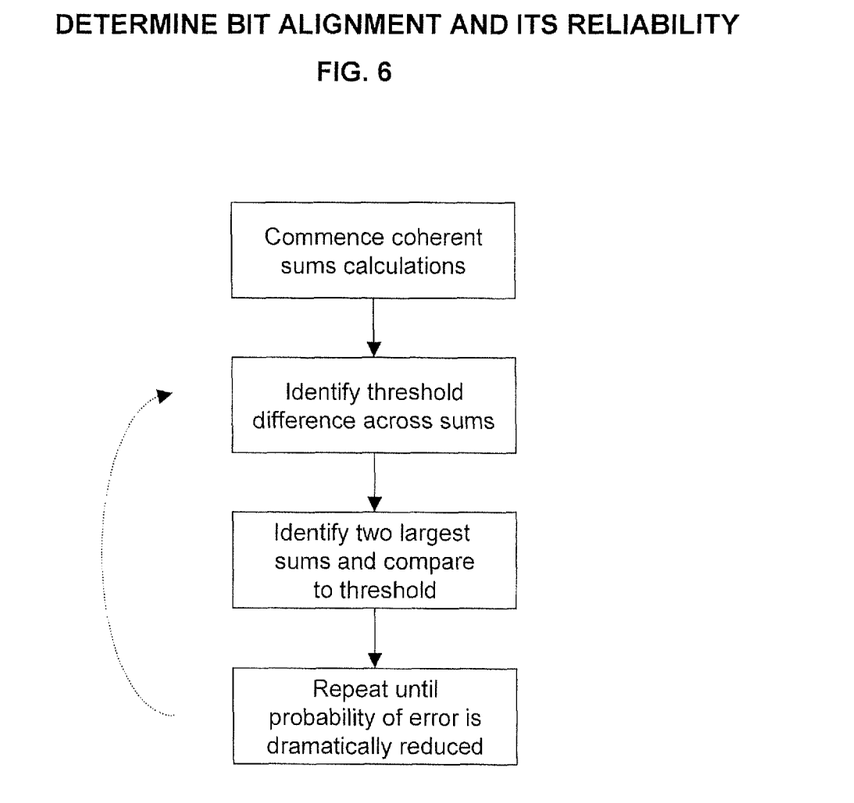
FIG. 6 presents a high-level flow chart of the steps required in the present invention for determining bit alignment and its reliability.

In addition, both the bit alignment and its reliability must be determined. The methodology is shown in FIG. 6. One approach is to compare the difference between the two largest sums to a threshold. The threshold can be determined apriori based on estimated signal carrier to noise ratio or adaptively. This process can be repeated in order to improve its integrity by dramatically reducing the probability of error.

Figure 7:
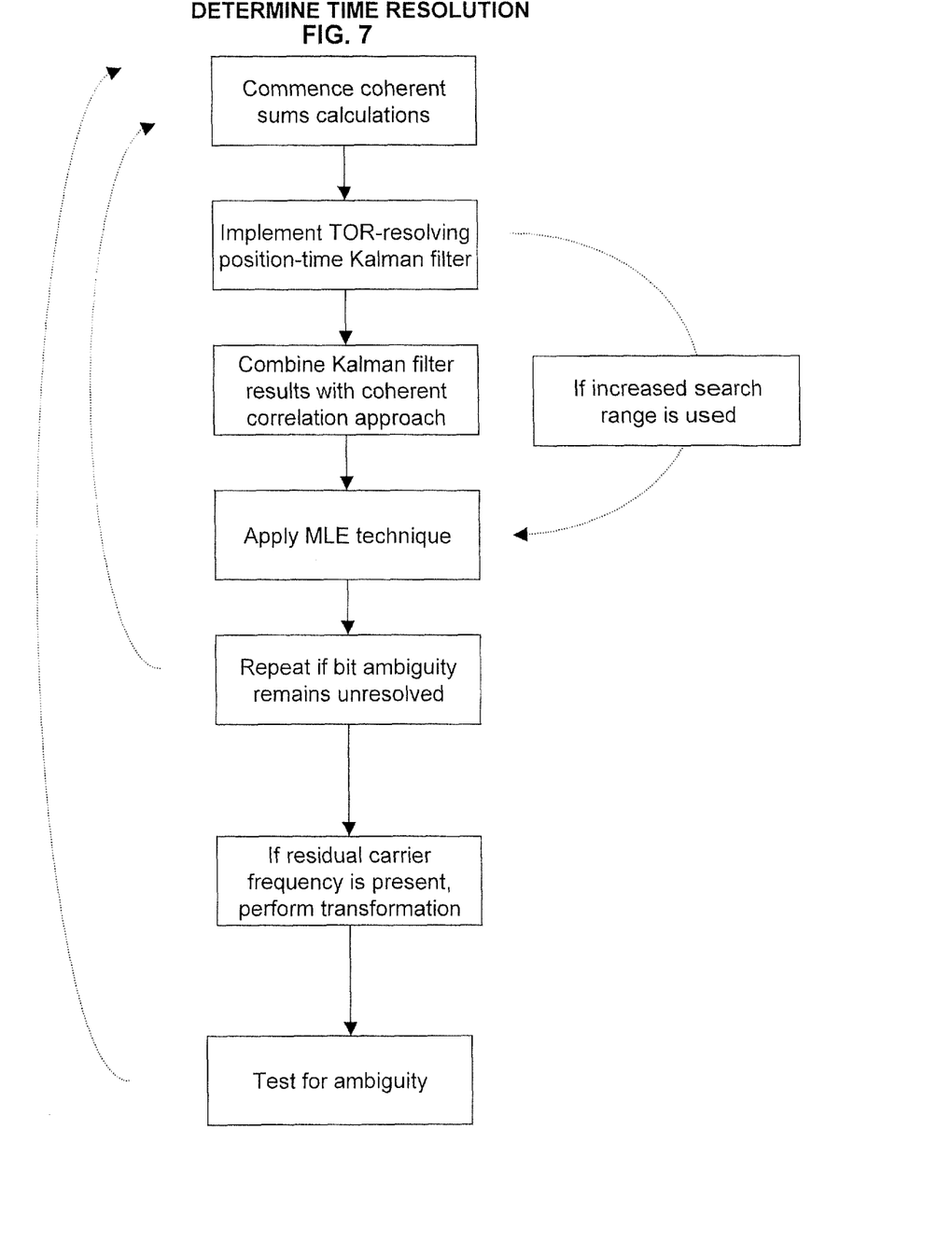
FIG. 7 presents a high-level flow chart of the steps required in the present invention for determining time resolution.

A flow chart of the methodology for time resolution is shown in FIG. 7. In addition, time resolution can be determined to better than 10 ms by utilizing a TOR-resolving position-Time Kalman filter as described in U.S. application Ser. No. 11/460,784 and U.S. application Ser. No. 11/769,259 which are hereby incorporated by reference. The first option is to formulate the solution in terms of an extended Kalman filter (such as described by P. Axelrad and R. G. Brown, "GPS Navigation Algorithms," in *Global Positioning Systems: Theory and Applications Volume* 1, B. W. Parkinson, J. J. Spilker, P. Axelrad, and P. Enge, Eds.: American Institute of Astronautics and Aeronautics, Inc, 1996), rather than the single shot solution algorithm just described. The procedure for doing this is straightforward and requires the inclusion of the TOR timing error $\Delta T$ as an additional element in the Kalman filter state vector. The Kalman filter can be operated over a number of GPS measurements until the state-covariance associated with $\Delta T$ has fallen significantly below one millisecond. Provided the Kalman filter state covariance represents a realistic estimate of the error, it is then possible to correct the receiver TOR using the calculated estimate after which this TOR can be locked-in and a switch to a conventional solution process performed. By combining this better time resolution approach with the 20 ms bit ambiguity one can completely resolve the ambiguity leading to precise time resolution using the codephase measurements with no ambiguity.

The validity of the time resolution can be tested by performing long coherent correlations across many bit periods taking into account the bit sequence known in advance. This data correlation process is depicted in FIG. 3. This approach will yield a very high correlation if the bit ambiguity has been properly resolved. If not, this approach will yield a very low correlation and one could repeat the methodology to resolve the ambiguity. Such an approach applies to the target applications because the GPS receiver generally is not moving during the time period for determining the position for synchronization. becasue the receiver is not moving, the Doppler offset will be approximately fixed and the residual carrier frequency will not be changing significantly during the long coherent correlations. If the Doppler offset is changing, the benefits of long coherent correlation may be lost leading to inability to resolve the ambiguities.

This same step may be used to test for correct resolution of the 20 ms ambiguity or a method for resolving the 20 ms ambiguity using a MLE technique. This depends on whether a single test is performed or multiple tests. The result of the step is to correlate the signal with the known navigation data bits over several hundred bits. Because bit synchronization was already determined, the signal is pre-integrated over 20 ms bit-periods. Several hundred of these bit-aligned partial integrals are stored in a Signal Store. These partial integrals are then multiplied by the test bits and summed to provide a correlation value to be tested by comparison with a threshold. Multiple tests can be performed by repeating with bit-shifted sequences of the partial sums or the data bits.

Note that the signal is being tracked in code phase and frequency and in carrier frequency. However, some residual carrier frequency will typically be present. Therefore, rather than simply summing the partial sums after multiplication by the data bits, a fast Fourier transform (FFT) is used. Integration over several seconds will suffer from the phase rotation of the signal leading to significantly reduced correlation and may result in failure to resolve the ambiguity unless the residual carrier phase rotation is allowed for. Other forms of Fourier transform or a bank of filters could be used as alternatives to the FFT. However, the FFT is preferred because it is a highly efficient implementation.

To perform the test of each ambiguity resolution candidate we test for correct synchronization of the signal with the data sequence which is known apriori. This is done by comparing the peak of the FFT to a threshold, based upon empirical data stemming from correlations across all of the candidates. For example, a threshold may be set as several standard deviations above the mean across all candidates. In order to ensure that the successful candidate is clearly distinguished from all other candidates a secondary threshold can be set in a similar way and no other candidate may be permitted to be above the secondary threshold for the test to be successful. If no candidate is successful a new set of samples is read into the signal store and the process is repeated.

If this latter process is used with an increased search range so that it includes the complete range of the initial time uncertainty, it is not necessary to include the step of using the TOR-resolving position-Time Kalman filter to determine time to better than 10 ms.

Once the ambiguities are resolved in a particular embodiment one may track time continuously by monitoring codephases, counting code epochs and taking account of measured Doppler offsets. The accurate time could be further utilized by outputting synchronization pulses at any desired repetition rate with sub-microsecond precision and stamping these with time via a communications port of some sort. Similarly one could discipline the receiver's reference oscillator by estimating the frequency bias of the oscillator using the Doppler measurements and the estimated time and position and steering the local oscillator to the correct frequency.

We claim:

1. A method for determining a time of transmit of a Global Navigation Satellite System (GNSS) signal to a receiver that is not moving or is slowly moving relative to the earth, the method comprising:
    (a) acquiring and tracking, in the receiver, a code phase and a carrier frequency of the GNSS signal;
    (b) obtaining bit synchronization based on the code phase and the carrier frequency by performing non-coherent correlations over rounds of coherent correlations of the GNSS signal using multiple offsets at a predetermined spacing;
    (c) pre-integrating the bit synchronized GNSS signal over data bit periods to form bit-aligned partial integrals;
    (d) storing the bit-aligned partial integrals in a signal store;
    (e) multiplying the stored bit-aligned partial integrals by data test bits; and
    (f) applying a mathematical transformation on the product of the stored bit-aligned partial integrals and the data test bits to provide correlation values to be compared with at least one threshold thereby providing an ambiguity resolution candidate for time of transmit of the GNSS signal.

2. The method of claim 1, wherein the mathematical transformation is a Fourier transform.

3. The method of claim 1 further comprising repeating steps (e) and (f) with bit-shifted sequences of the bit-aligned partial integrals to produce multiple ambiguity resolution candidates for time of transmit of the GNSS signal.

4. The method of claim 3, wherein the mathematical transformation is a Fourier transform.

5. The method of claim 1 further comprising repeating steps (e) and (f) with bit-shifted sequences of the data test bits to produce multiple ambiguity resolution candidates for time of transmit of the GNSS signal.

6. The method of claim 5, wherein the mathematical transformation is a Fourier transform.

7. The method of claim 1, wherein a peak of the mathematical transformation is compared with the threshold.

8. The method of claim 7, wherein the mathematical transformation is a Fourier transform.

9. The method of claim 3, wherein the at least one threshold is determined from statistics of the correlations values across all of the candidates.

10. The method of claim 3, further comprising setting the at least one threshold several standard deviations above a mean across all candidates.

11. The method of claim 3, further comprising:
    setting a secondary threshold; and
    permitting no other candidate to be above the secondary threshold for a test of each candidate to be successful.

* * * * *